Oct. 21, 1958

B. A. NOBLE ET AL 2,857,038

GLASS CONTAINER INSPECTING MECHANISM

Filed May 15, 1956

Inventors:
BURTON A. NOBLE
WALLACE W. WOLFORD
By Rule & Hoge
Their Attorneys

Oct. 21, 1958   B. A. NOBLE ET AL   2,857,038
GLASS CONTAINER INSPECTING MECHANISM
Filed May 15, 1956   2 Sheets-Sheet 2

INVENTORS
BURTON A. NOBLE
WALLACE W. WOLFORD
BY
ATTORNEYS

United States Patent Office 2,857,038
Patented Oct. 21, 1958

2,857,038

GLASS CONTAINER INSPECTING MECHANISM

Burton A. Noble and Wallace W. Wolford, Oakland, Calif., assignors to Owens-Illinois Glass Company, a corporation of Ohio Application May 15, 1956, Serial No. 585,015

9 Claims. (Cl. 198—33)

The present invention relates to improvements in glass container inspecting mechanism and more particularly to means for placing empty glass bottles and the like containers in proper position in relation to and then manipulating them in the presence of an optical inspecting device, the latter being located at an inspecting station at which such bottles are brought in succession by an endless series of cradles.

An object of our invention is the provision of simple and efficient means for automatically lifting the containers bodily from the cradles one at a time at the inspecting station and supporting them for rotation about their axes in such fashion as to permit the optical inspecting device to scan the bottom and adjacent side wall sections to the end that checks and similar defects may be detected, if present, and such ware discarded.

Another object of our invention is the provision of novel means for supportingly engaging the lower portions of the container side wall and adjustment for such means to the end that it can readily accommodate containers of various diameters.

A further object of our invention is the provision of means for elevating bottles or such containers from recumbent positions on the cradles and supporting and rotating the bottles, such means being of a character to permit ready and complete scanning of the desired areas by an optical inspecting device.

A still further object of our invention is the provision of means for presenting empty glass containers in a recumbent position at the inspecting station together with novel means for elevating the containers and rotating them in the presence of an optical inspecting device, the latter being positioned at the inspecting station and capable of effectively scanning those areas of the bottom and adjacent side walls in which checks and such defects are most likely to be present.

Other objects will be in part apparent and in part pointed out hereinafter.

Figure 7:
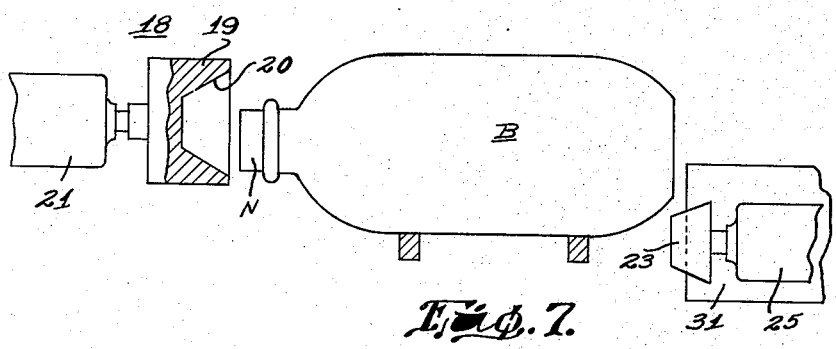
Figs. 7, 8 and 9 are views more or less diagrammatically or schematically showing the successive positions assumed by the bottle or such article from the time of its arrival at its inspecting station until it is lifted from the cradles and being rotated and scanned by the optical inspecting device.

In Fig. 7, the bottle is lying in a recumbent position upon a cradle and has just arrived at the inspecting station.

Figure 8:
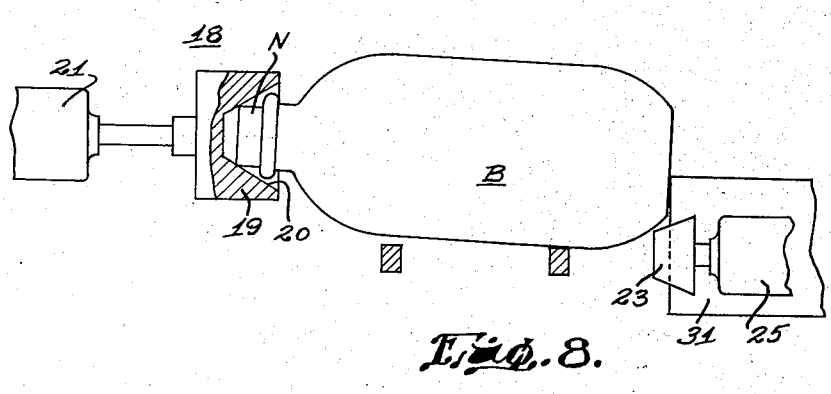

In Fig. 8, the neck chuck has moved axially inward and its interior conical surface has elevated the neck end of the container until the axes of the latter and the chuck coincide. In this same figure, the container is in contact with the rotating means.

Figure 9:
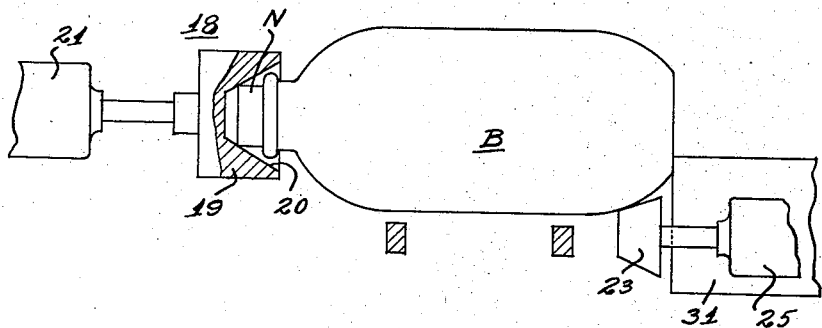

In Fig. 9, the base supporting rollers have been projected inwardly and are cooperating with the neck chuck in supporting the bottle with its entire axis in register with the axis of the neck chuck.

Figure 1:
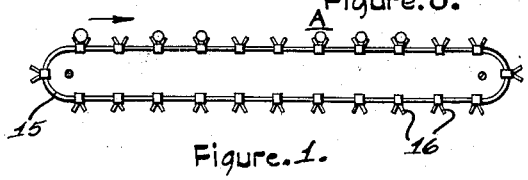
Fig. 1 is a schematic view illustrating a cradle conveyor system which brings empty glass bottles or jars in a step-by-step fashion to various inspecting stations.

The present apparatus is part of a machine which functions to inspect bottles and the like empty glass containers for various defects. The machine proper includes an endless conveyor 15, Fig. 1, supporting a plurality of cradles 16, and movable intermittently (by means not shown) to bring the cradles in succession to several inspecting stations (not indicated) for the purpose above explained. At one such station, A, Fig. 1, there is positioned an optical inspecting device 17 which is of well-known conventional form and is so mounted that it will scan the adjacent bottom and side surfaces of each container as the latter is brought to the inspecting station and rotated about its axis in a fashion which will be apparent in the following description. This optical inspecting device is of such type that it operates in response to the presence of a check or such defect in the scanned area and, in turn, causes the operation of ejecting mechanism (not shown) which will remove the imperfect container at a preselected point. As has been explained above, the cradles move intermittently, each being brought to a standstill momentarily at the inspecting station A where it remains for a sufficient period of time to permit lifting, rotating and lowering of each container with respect to its cradle. The containers, as will be observed, occupy recumbent positions upon the cradle 16.

For the purpose of lifting the containers bodily away from the cradles at the inspecting station, and rotating them so that the optical inspecting device can scan predetermined portions of such containers, the following mechanism is utilized.

To one side of the path of travel of the cradles at the inspecting station A there is a neck chuck unit 18 comprising a cup-like chuck 19 having a conical inner surface 20, said chuck being connected to an air-operated piston motor 21. This conical surface 20, as shown, decreases in diameter toward the motor 21. This chuck 19 is mounted for free rotation about its axis, which axis, incidentally, is that with which the axis of each container will coincide when the latter is properly positioned for inspection purposes. Axial reciprocation of the chuck 19, by means of the motor 21, moves said chuck into and out of engagement with the neck N of the bottle B.

Figure 6:
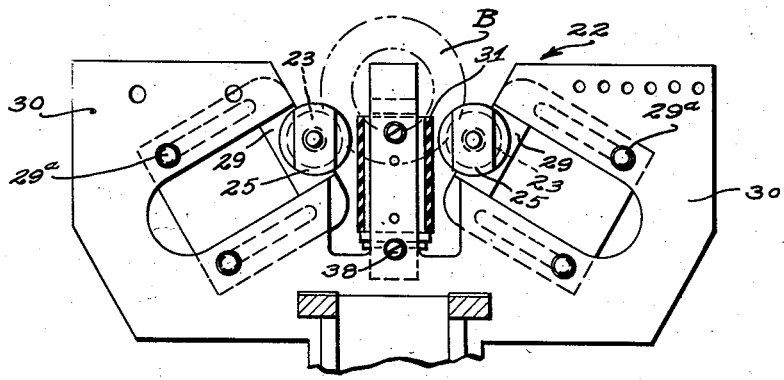
Fig. 6 is a vertical sectional elevational view taken substantially along the plane of line 6—6 of Fig. 5.

On the opposite side of the path of travel of the cradles from the neck chuck 18 and at this same inspecting station A is an auxiliary bottle supporting and rotating unit 22. This unit comprises a pair of freely rotating frusto-conical rollers 23 which are positioned with their axes disposed horizontally in parallel relationship to each other and in a common horizontal plane below the plane of the neck chuck 19 axis. Each of these rollers 23 is mounted upon the outer end of a piston rod 24 which is disposed in a cylinder 25 and at its inner end carries a piston 26. The inner end of this cylinder 25 is provided with a plug 27 having an axial passageway 28 therethrough to which air under pressure is supplied by any conventional means (not shown). The introduction of air under pressure moves the roller 23 to its projected container supporting position in opposition to a coil spring 24a which encircles the piston rod within the cylinder 25. Each of these two cylinders 25 is mounted on a slotted bracket 29 (Fig. 4) and these brackets, in turn, are adjustably mounted in frames 30 (Fig. 6), and lockable by screws 29a in any desired position so that the rollers may be adjusted to accommodate bottles varying in diameter.

Figure 4:
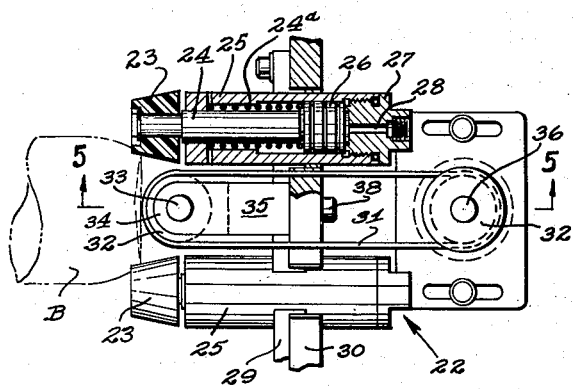
Fig. 4 is a plan view with parts in section of the unit including the bottle supporting rollers and bottle rotating means.
Figure 3:
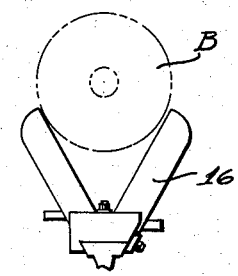
Fig. 3 is a fragmentary elevational view of one of the cradles.
Figure 5:
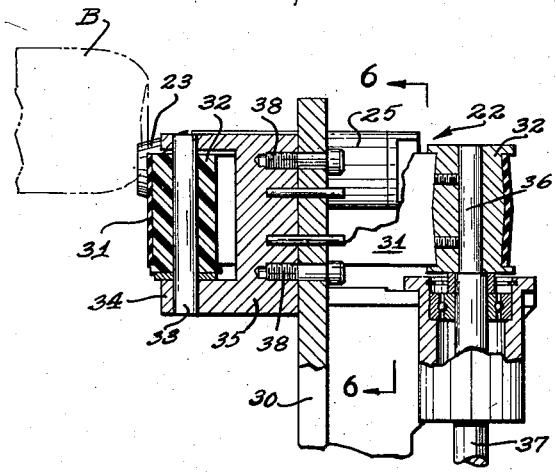
Fig. 5 is a sectional elevational view taken substantially along the plane of line 5—5 of Fig. 4.

The container rotating means is positioned at least in part between the two cylinders 25 and comprises an endless belt 31 or an equivalent device. In this instance, the belt 31 is trained over a pair of horizontally spaced rollers 32, one of which is carried by a vertical shaft 33 which is mounted in a pair of arms 34 on a bracket 35 while the other roller is pinned to a driven vertical shaft 36 which is suitably connected to a motor (not shown) by a shaft extension 37. As shown in Figs. 4 and 5, the bracket 35 which carries the roller nearest the bottle position is separably connected to the frame 30 by means of screws or such fasteners 38. It will also be observed by reference to Figs. 5 and 6 that the container rotating means which engages the bottom of the container or such article when the later is in its uppermost position (Fig. 9), contacts such bottom surface only in a small segment of a narrow annular zone at the periphery of such bottom. The rotating means, at its point of contact with the container bottom, is moving along a plane tangent to said annular zone of container bottom.

Figure 2:
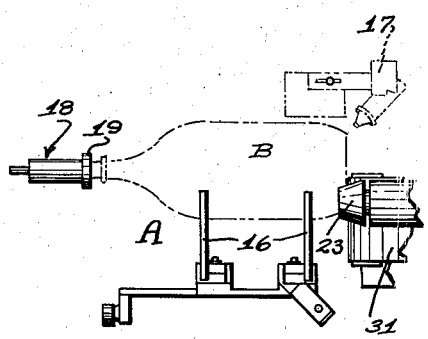
Fig. 2 is a detail elevational view showing one of the cradle units at the inspecting station with which the present invention is concerned and fragments of the container lifting and rotating means which comprises the present invention. The optical inspecting device is indicated in dotted lines above the base portion of a bottle which is also shown in dot and dash outline.

It is thought to be apparent, in view of the foregoing, that bottles or the like empty glass containers are brought one at a time to the inspecting station A and that their advancing movement is interrupted temporarily at such station while they are elevated by means of the neck chuck 19 and rollers 23 as indicated in Figs. 7, 8 and 9, so that the bottle is quickly brought to the inspecting position shown in Fig. 2 wherein it is rotated by means of the belt 31, or some equivalent device, to the end that a preselected annular area may be scanned by the optical inspecting device 17. Adjustment of the rollers 23 (Fig. 6), by moving the brackets 29 along their inclined paths permits the device to accommodate bottles varying in diameter.

Modifications may be resorted to within the spirit and scope of the appended claims.

I claim:

1. In combination an endless series of cradles for supporting hollow generally cylindrical glass containers in recumbent positions for rotation about their longitudinal axes in which such containers are free to be lifted bodily upward away from said cradles, the cradles being movable along a horizontal path in a step-by-step fashion to thereby bring them in succession to an inspecting station, automatic means operable both for lifting a container out of contact with a cradle and moving it axially at said station and driven container rotating means with which the container is brought into operative engagement incident to said lifting and axial movement of the container.

2. The combination defined in claim 1, the driven container rotating means comprising a continuously moving element positioned for engagement with a segment of the periphery of the bottom of a container.

3. The combination defined in claim 1, the driven container rotating means comprising a continuously moving endless belt positioned for contact with a segment of the periphery of the bottom of a container.

4. The combination defined in claim 1, the container lifting means comprising a neck chuck positioned at the inspecting station at one side of the path of travel of the cradles and with its axis disposed horizontally, a pair of freely rotatable frusto-conical rollers spaced horizontally from said neck chuck and having their axes parallel and disposed in a common horizontal plane below the axis of the neck chuck and means for moving the neck chuck and rollers axially inward toward a cradle to thereby lift a container from the latter and effect driving engagement between the bottom of the container and the rotating means.

5. The combination defined in claim 4, the neck chuck being a freely rotatable cup-like element having a conical inner surface for engagement with the neck of a container and having its axis of rotation disposed horizontally and means for reciprocating the chuck axially.

6. The combination defined in claim 4, a mounting for each of said frusto-conical rollers comprising a rod and piston, a cylinder in which the rod and piston are mounted for reciprocation, spring means normally urging the roller into a retracted position and means for introducing air under pressure into the cylinder and thereby advance the roller into container supporting position.

7. The combination defined in claim 6, brackets individual to and supporting the roller carrying cylinders and means for adjusting the brackets and rollers to accommodate containers of varying body diameter.

8. In combination an endless series of cradles for supporting hollow generally cylindrical glass containers in recumbent positions in which such containers are free to be lifted bodily upward away from said cradles, the cradles being movable along a horizontal path in a step-by-step fashion to thereby bring them in succession to an inspecting station, automatic means for lifting a container out of contact with a cradle and supporting such container for rotation about its axis, said means comprising a freely rotatable neck chuck positioned at the inspecting station to one side of the cradle, said chuck being a cup-like element having a conical inner surface facing the cradles and having its axis of rotation disposed horizontally, a piston motor for reciprocating the neck chuck, a pair of frusto-conical rollers positioned at the opposite side of the cradles from the neck chuck at said inspecting station, said rollers mounted upon horizontal axes lying in a common horizontal plane below an extension of the axis of the neck chuck, pneumatic means for moving the rollers axially into and out of supporting engagement with the lower body portion of a container at said station and in synchronism with reciprocation of the neck chuck and a container rotating device mounted between said rollers for engagement with the bottom of a container while the latter is supported upon the rollers.

9. The combination defined in claim 8, the container rotating device being a continuously driven belt.

References Cited in the file of this patent

UNITED STATES PATENTS

| | | |
|---|---|---|
| 2,021,696 | Miller | Nov. 19, 1935 |
| 2,354,628 | Whitesell | July 25, 1944 |
| 2,395,620 | Fogle | Feb. 26, 1946 |
| 2,403,662 | Hurley | July 9, 1946 |
| 2,446,377 | Marshall | Aug. 3, 1948 |